Patented July 21, 1925.

1,546,833

UNITED STATES PATENT OFFICE.

CHARLES F. GEIGER, OF PERTH AMBOY, NEW JERSEY, ASSIGNOR TO THE CARBORUNDUM COMPANY, OF NIAGARA FALLS, NEW YORK, A CORPORATION OF PENNSYLVANIA.

REFRACTORY ARTICLE AND METHOD OF MAKING THE SAME.

No Drawing.    Application filed June 30, 1923.   Serial No. 648,827.

*To all whom it may concern:*

Be it known that I, CHARLES F. GEIGER, a citizen of the United States, residing at Perth Amboy, county of Middlesex, State of New Jersey, have invented a new and useful Improvement in Refractory Articles and Methods of Making the Same, of which the following is a full, clear, and exact description.

My invention relates to an improved method of bonding silicon carbide for the production of refractory articles, such as bricks, furnace linings, etc. Silicon carbide has well known refractory properties and requires a temperature above 2200° C. to decompose it. It has been used for refractory purposes in two forms, first, as a pure silicon carbide article without a binder as described, for example, in U. S. Patents Nos. 992,698 and 1,013,700, to F. J. Tone; and second, as silicon carbide grains bonded with a ceramic material as described in detail in U. S. Patent No. 1,204,211 to F. J. Tone. While the refractory material therein described has been satisfactory for certain types of furnaces, especially those in which only moderately high temperatures are encountered, I have discovered that silicon carbide grains may be bonded together to form refractory shapes by the use of certain inorganic salts or compounds, which at high temperature in the presence of oxygen react with the silicon carbide to form a high melting compound. This high melting compound then functions as a binder and provides a refractory body with improved refractoriness and resistance to other high temperature conditions.

Another advantage of my improved silicon carbide article is the desirable reduction of the free silica content of the finished article. Heretofore, in the manufacture of bonded silicon carbide articles much difficulty has been encountered due to the production of excessive amounts of silicon dioxide by oxidation of the silicon carbide during the firing operation. This is overcome by the use of sufficient aluminum oxide to react with the silica formed from the silicon carbide by oxidation, thus giving a high melting aluminum silicate, such as for example sillimanite $Al_2O_3SiO_2$. The aluminum silicate thus produced has marked advantages over the free silica which would otherwise be present, in decreasing the tendency to expand and contract, in resistance to erosion by molten slags and in mechanical strength.

In carrying out my invention, I preferably use silicon carbide ranging in size from 14 mesh to the finest particles. I have found that 40% by weight of particles 14 to 36 mesh, 20% 36 to 80 mesh, and 40% 80 mesh and finer gives me the maximum density and minimum porosity in my finished article, these properties being desirable in order to produce great strength and resistance to slag penetration.

To this mixture of silicon carbide grain, I add, for example, 10 parts of finely divided aluminum oxide. This mixture is tempered with sufficient water to bring it to the consistency of molding sand, after which it is subjected to a pressure of a ton or more to the square inch to form the desired shaped article. It is then dried and fired at high temperature in an oxidizing atmosphere. During the burning, some of the silicon carbide is oxidized to form silicon dioxide and oxides of carbon. The alumina in its finely divided state reacts with the silica and under suitable conditions forms a bonding material consisting principally of aluminum silicates or sillimanite. This bond has a very high melting point and combined with the refractoriness of inert particles of silicon carbide produces a highly refractory composite body. The refractory body thus produced serves substantially as a solid silicon carbide article and thus has great resistance to heat and corrosive action of slags and gases when used in various kinds of oil, gas, powdered coal, and electric furnaces in which excessively high temperatures are encountered.

Although I have specified the use of alumina in the above illustrated example, it will be understood that I do not restrict myself thereto but may use other aluminum compounds as, for example, the hydrates of aluminum, which when heated will react with silica to produce a high melting form of aluminum silicate such as sillimanite.

I claim:

1. The process of making refractory articles which includes mixing silicon carbide with an aluminum compound which will react with silica at high temperature to form aluminum silicate, and heating the mixture to a temperature sufficient to oxidize a portion of the silicon carbide to silica and cause said silica to react with the aluminum compound to form a high melting silicate of alumina.

2. The process of making refractory articles which includes mixing silicon carbide with alumina and heating the mixture to a temperature sufficient to oxidize a portion of the silicon carbide to silica and cause said silica to react with the alumina to form sillimanite.

3. The process of making refractory articles which includes mixing silicon carbide with an aluminum compound which will react with silica at high temperature to form aluminum silicate, and heating the mixture to a temperature sufficient to oxidize a portion of the silicon carbide to silica and cause said silica to react with the aluminum compound to form a high melting silicate of alumina, the silicon carbide being substantially 40% by weight of particles, 14 to 36 mesh, 20% 36 to 80 mesh, and 40% 80 mesh or finer.

4. The process of making refractory articles which includes mixing silicon carbide with an aluminum compound which will react with silica at high temperature to form aluminum silicate, and heating the mixture to a temperature sufficient to oxidize a portion of the silicon carbide to silica and cause said silica to react with the aluminum compound to form a high melting silicate of alumina, the amount of aluminum compound used being substantially 10% by weight of the amount of silicon carbide.

5. The process of making refractory articles which includes mixing silicon carbide with alumina and heating the mixture to a temperature sufficient to oxidize a portion of the silicon carbide to silica and cause said silica to react with the alumina to form sillimanite, the silicon carbide being substantially 40% by weight of particles, 14 to 36 mesh, 20% 36 to 80 mesh, and 40% 80 mesh or finer, and the silica being in the amount of substantially 10% by weight of the silicon carbide.

6. The process of making refractory articles which consists in mixing silicon carbide and alumina, the silicon carbide constituting at least 80% of the mix, forming the mixture into shapes and burning the shaped article.

7. As a new article of manufacture a refractory article consisting substantially of silicon carbide, alumina and an aluminum silicate, and containing no graphite.

8. As a new article of manufacture a refractory article consisting substantially of silicon carbide, free alumina and sillimanite.

9. As a new article of manufacture a refractory article consisting substantially of finely divided silicon carbide and alumina bonded by sillimanite.

10. A refractory article containing silicon carbide, alumina and a binder produced by the reaction of said silicon carbide and alumina.

11. As a new article of manufacture a highly refractory article containing at least 80% silicon carbide, and alumina.

In testimony whereof I have hereunto set my hand.

CHARLES F. GEIGER.